United States Patent [19]
Vo et al.

[11] Patent Number: 6,053,627
[45] Date of Patent: Apr. 25, 2000

[54] LIGHTED MODULAR TRAILER HITCHING SOCKET COVERING SYSTEM, AND METHOD OF USE

[76] Inventors: Loi V. Vo, 11400 SW. 27th St., Lincoln, Nebr. 68523; Jack M. Hoenig, 1709 Oakdale Ave., Lincoln, Nebr. 68506

[21] Appl. No.: 09/115,478

[22] Filed: Jul. 15, 1998

[51] Int. Cl.$^7$ .................................................. B60Q 1/26
[52] U.S. Cl. ..................... 362/485; 362/498; 362/497; 362/504; 362/515; 362/523; 362/60
[58] Field of Search ..................... 362/485, 498, 362/497, 504, 505, 515, 523, 60; 280/455.1, 502, 505, 511

[56] References Cited

U.S. PATENT DOCUMENTS

| | | |
|---|---|---|
| D. 317,890 | 7/1991 | Bachmann . |
| D. 336,880 | 6/1993 | Drummond . |
| D. 344,257 | 2/1994 | Epparel . |
| D. 358,194 | 5/1995 | Thigpen . |
| D. 359,018 | 6/1995 | Thigpen . |
| D. 368,059 | 3/1996 | Barth . |
| 3,658,363 | 4/1972 | Marler ...................................... 280/511 |
| 4,204,701 | 5/1980 | Oltrogge ............................. 280/491 E |
| 4,800,471 | 1/1989 | Lippert ...................................... 362/80 |
| 5,157,591 | 10/1992 | Chudzih ...................................... 362/60 |
| 5,603,178 | 2/1997 | Morrison ...................................... 40/591 |
| 5,620,198 | 4/1997 | Berchers ................................... 280/507 |

*Primary Examiner*—Cassandra Spyrou
*Assistant Examiner*—Mohammad Y. Sikder
*Attorney, Agent, or Firm*—James D. Welch

[57] ABSTRACT

A modular lighted vehicle trailer hitching socket covering means system which when mounted to a vehicle trailer hitching socket essentially blocks it from view in a decorative manner, is disclosed. The system provides a single tongue element which is of a shape and size to slide into a vehicle trailer hitching socket, (wherein it is secured in place by a securing means during use), in combination with a selected detachably affixed, ornamental item with a shape such as a football, a basketball, a soccer ball etc., or a hockey puck, or an item with outer shape of a mascots etc., or even simple flat surface.

9 Claims, 3 Drawing Sheets

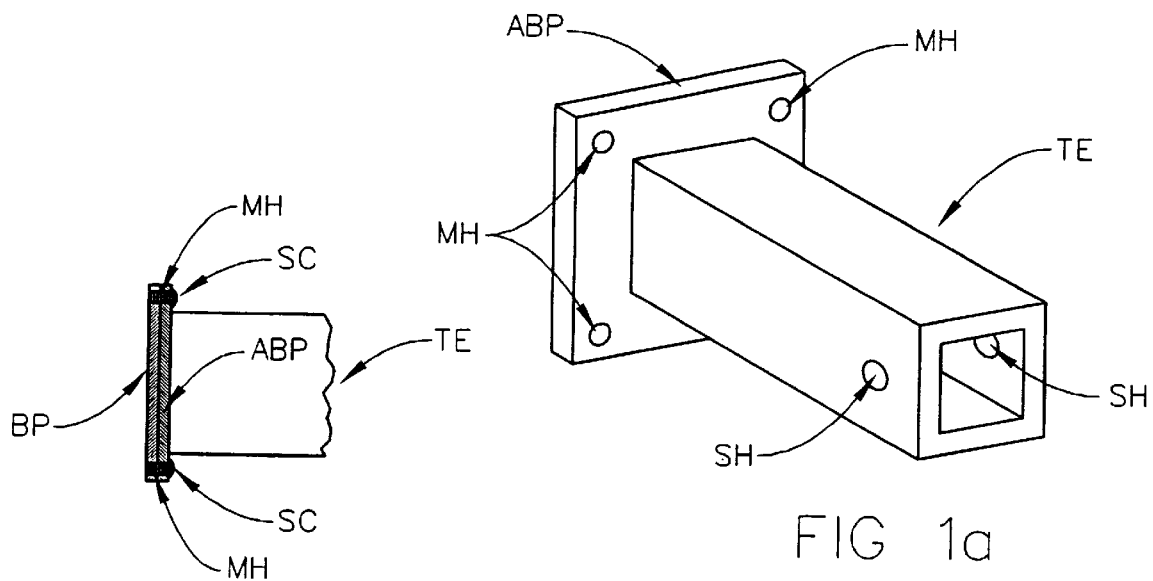
FIG 1a
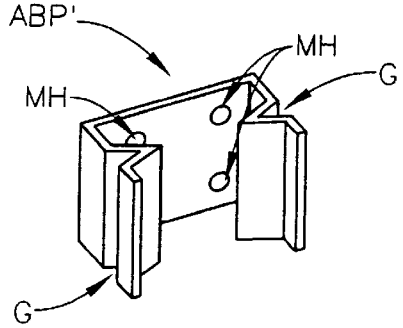
FIG 1b
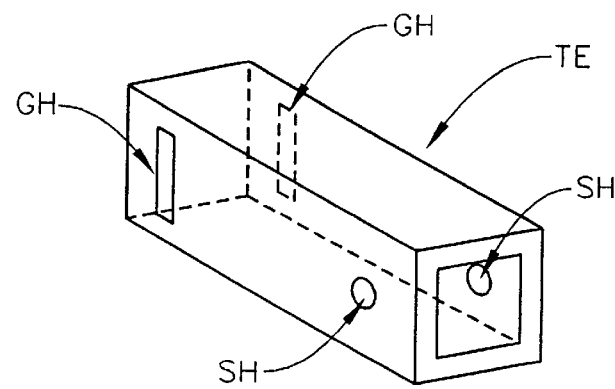
FIG 2a
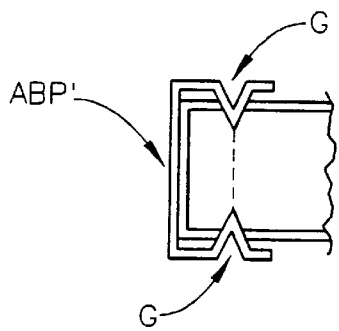
FIG 2b
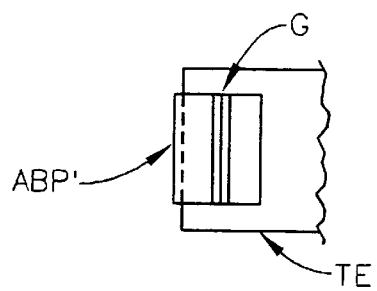
FIG 2c
FIG 2d

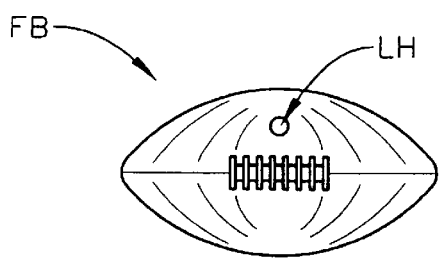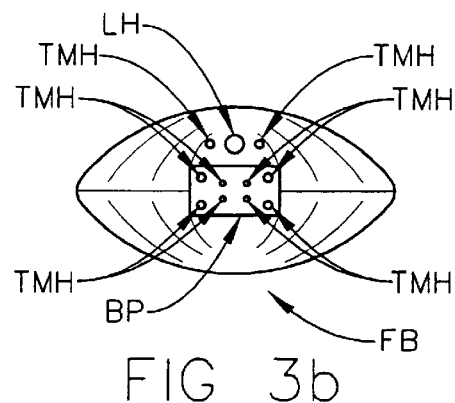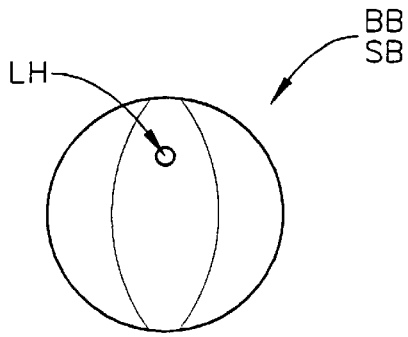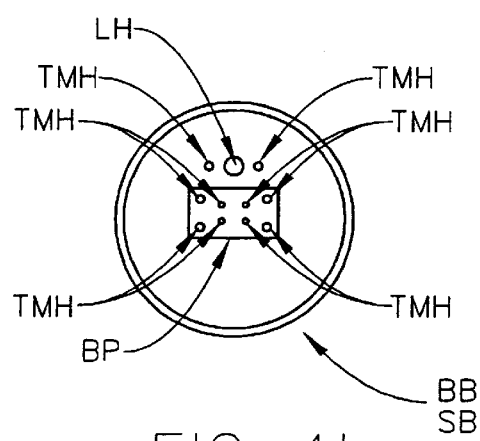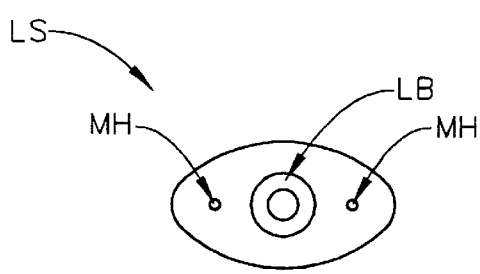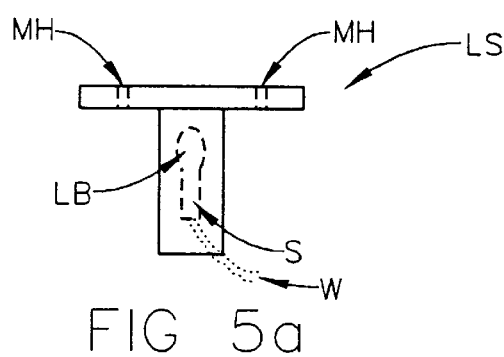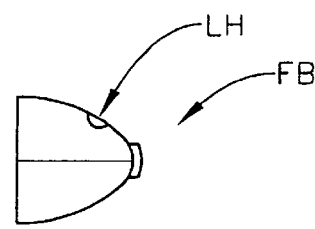

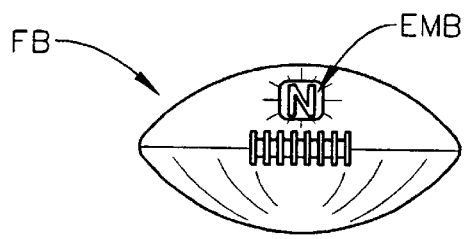
FIG 6a
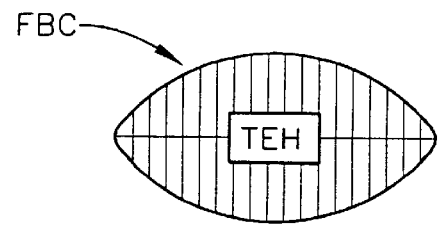
FIG 7
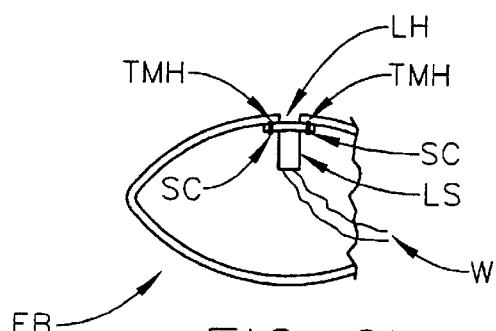
FIG 6b
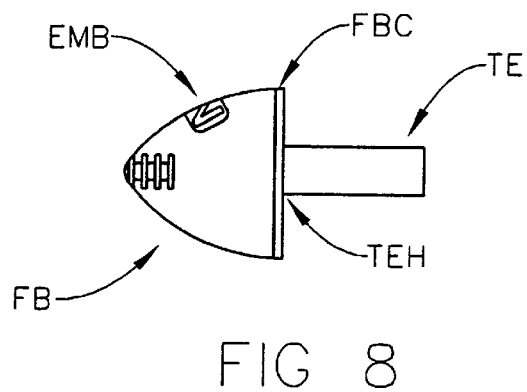
FIG 8
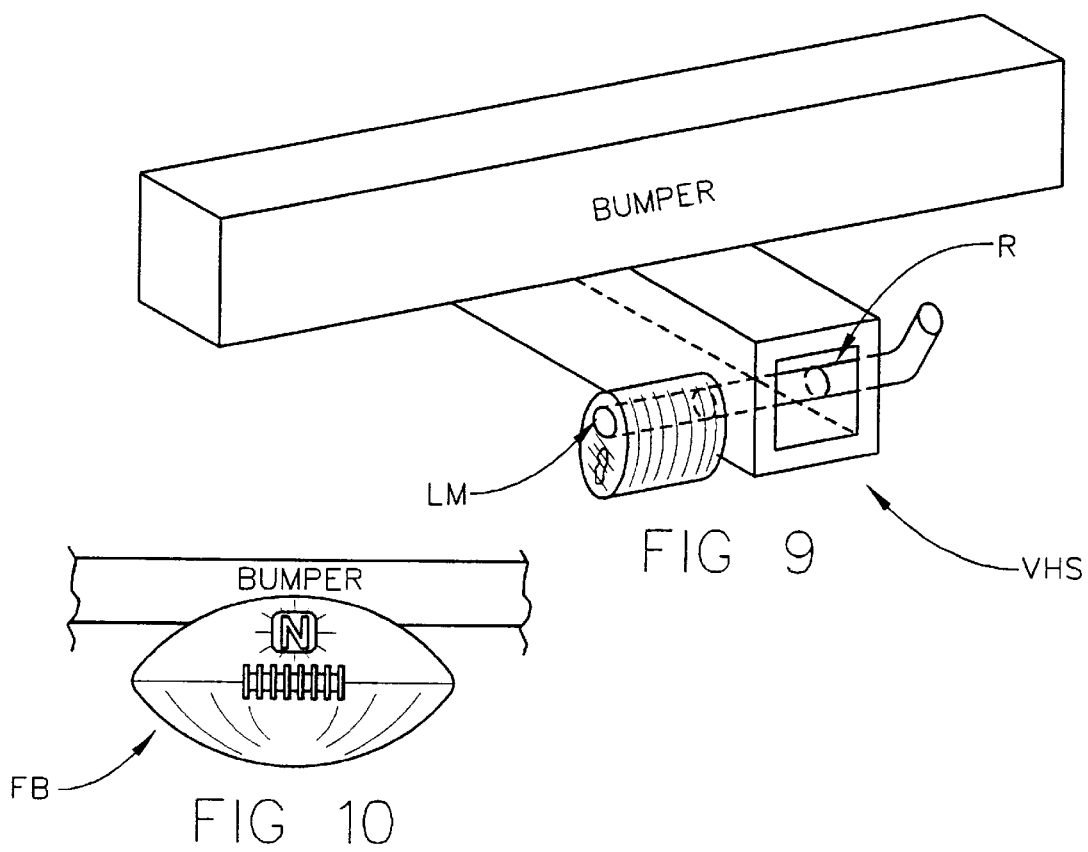
FIG 9
FIG 10

LIGHTED MODULAR TRAILER HITCHING SOCKET COVERING SYSTEM, AND METHOD OF USE

TECHNICAL FIELD

The present invention relates generally to vehicle trailer hitching socket covering sytems, and more particularly to a lighted, modular vehicle trailer hitching socket covering system which when mounted to a vehicle trailer hitching socket essentially blocks said vehicle trailer hitching socket from view, in a decorative manner.

BACKGROUND

Vehicles such as autos, trucks, recreational vehicles, sports utility vehicles and the like are often equipped with a vehicle trailer hitching socket which is located near a rear bumper thereof, (typically positioned below said rear bumper). For insight it is noted that standard vehicle trailer hitching sockets are on the order of two inches square, or one inch by two inches rectangular. The purpose of said vehicle trailer hitching socket is primarily to allow attaching trailers to the vehicle for towing. Said trailers typically have a socket providing means attached thereto, which socket in said socket providing means, in use, is caused to mate with a ball means, which ball means is attached to a tongue element which is of a shape and size to allow it to functionally slide into said vehicle trailer hitching socket, wherein it is secured in place by a securing means. When unused, however, it has been noted that a vehicle trailer hitching socket presents a means for attaching other than a trailer to said vehicle.

Continuing, particularly in a University Football State like Nebraska, (but certainly not limited thereto), such a means for attaching something to a vehicle presents a convenient via for securing items which display team-spirit and the like. In addition, businesses often like to removably attach advertisement displaying means to their vehicles as evidenced by use of removable magnetic car signs. The present invention recognizes this and provides an array of items such as football, basketball and soccer balls, hockey puck, and items with outer shapes of mascots etc., and even simple flat space providing means for use as an attachment to a vehicle via a trailer hitching socket. Said items typically have logos and the like present thereon which denote a sports team, or alternatively, a business etc.

A search of Patents has provided a number of Design Patents which provide coverings for ball means which are present on an element which is of a shape and size to functionally slide into a ball on a vehicle trailer hitch tongue element. Some of said Design Patents show ball means coverings which are shaped like football, baseball etc. helmets (eg. D359,018; D317,890; D358,794; D336,880 and D344,257). Another Design Pat., No. D368,059 shows a trailer "hitching socket" covering means. Perhaps the most relevant Patent identified, however, is a recent Utility Patent to Morrison, No. 5,603,178. Said 178 Patent describes an ornamental cover for installation on a trailer hitching socket, and includes rather detailed description of an allen-head fastener which extends through a hole in a wall of a trailer hitching socket securing means, which Allen-head fastener threadedly engages a nutsert in the 178 Patent ornamental cover in place during use. While the 178 Patent specifically shows an essentially rectangular flat face shaped ornamental cover, it is stated in the 178 Patent that said ornamental cover can be of any three-dimensional shape, texture, topology, or form. Review of the Claims in the 178 Patent suggest that the focus of the invention disclosed therein, at least in the Patentability sense, was the presence of an internally threaded nutsert on an elongated ear extending from an insert which is, in use, inserted into a trailer hitch socket, said internally threaded nutsert being accessed by a threaded removable fastener which extends through a hole in a wall of a trailer hitch socket wall. While very interesting, said 178 Patent does not suggest, in combination:

a modular lighted vehicle trailer hitching socket covering means system which when mounted to a vehicle trailer hitching socket essentially blocks it from view in a decorative manner;

which system provides a single tongue element which is of a shape and size to slide into a vehicle trailer hitching socket, (wherein it is secured in place by a securing means during use);

in combination with a plurality of detachably affixed, (to said tongue element), ornamental items with a shape such as a football, a basketball, a soccer ball etc., or a hockey puck, or an item with outer shape of a mascot etc., or even a simple flat surface much as shown in the 178 Patent.

Additional Patent searching further showed that no art exists to a tongue element which is of a shape and size to functionally slide into a vehicle trailer hitching socket, (wherein it is secured in place by a non-protected securing means during use), in combination with a plurality of detachably affixed ornamental items with a shape such as a football, a basketball, a soccer ball etc., or a hockey puck, or an item with outer shape of a mascot etc., or even a simple flat surface, wherein the detachably affixed ornamental item has a light socket fixture as a part thereof. A U.S. Pat. No. to Chudzik 5,157,591 was identified, however, which describes an attachable auxiliary vehicle lighting system, and U.S. Pat. Nos. 5,620,198 and 4,204,701 to Borchers and Oltrogge, respectively, further describe a collar for a trailer hitch receiver and a universal quick detach accessory mount for vehicles or the like. These Patents are disclosed to provide general information and to identify the state of the relevant art.

In view of the prior art, need remains for modular, lighted decorative vehicle trailer hitching socket covering means systems.

DISCLOSURE OF THE INVENTION

The present invention is a modular vehicle trailer hitching socket covering means system, comprising a trailer hitching socket mating tongue element in combination with a plurality of interchangable vehicle trailer hitching socket covering means elements. In use a vehicle trailer hitching socket covering means element can be selected from a group consisting of vehicle trailer hitching socket covering means elements shaped essentially as halves of: (footballs, basketballs, soccer-balls and mascots etc). Said trailer hitching socket mating tongue element and a selected vehicle trailer hitching socket covering means element are then detachably secured to one another, with the resulting system being mounted to a vehicle trailer hitching socket by insertion of said trailer hitching socket mating tongue element into a vehicle trailer hitching socket. The desired result is that said vehicle trailer hitching socket is decoratively predominately blocked from view.

The vehicle trailer hitching socket covering means element preferably has a light hole therethrough and a light socket mounted inside said vehicle trailer hitching socket covering means element, such that light caused to eminate from a light bulb placed inside said light socket, (to which light bulb electric voltage is functionally applied), passes through said light hole in use. Said vehicle trailer hitching socket covering means element further comprises light diffusing means present thereon such that light passing through said light hole in use is diffused thereby. Said light diffusing means can be, but is not necessarily, a light diffusing plastic material. As well, the light diffusing means typically is selected to contain an emblem. This can be a letter (eg. "N" for Nebraska), or a character, (eg. Herbie Husker). It is noted that the light bulb can be provided electrical voltage essentially directly from said vehicle battery, or via a brake pedal activated brake light controlling switch, or via an emergency activated switch etc.

As a non-limiting example, said light socket mounted inside said vehicle trailer hitching socket covering means element, can be affixed to said vehicle trailer hitching socket covering means element by threaded shafts, bolts or screws which pass through mounting holes in said light socket, and screw into corresponding threaded holes inside said vehicle trailer hitching socket covering means.

As a further non-limiting example, a present invention modular vehicle trailer hitching socket covering means system trailer hitching socket mating tongue element can comprise an auxiliary base plate with a plurality of mounting holes therethrough, and each of said plurality of interchangable vehicle trailer hitching socket covering means elements each comprise a base plate therewithin which has a plurality of threaded mounting holes therein. Said trailer hitching socket mating tongue element and a selected interchangable vehicle trailer hitching socket covering means element can be detachably secured to one another by threaded shafts, bolts or screws which project through at least some of said plurality of mounting holes through said auxiliary mounting bracket and screw into corresponding threaded mounting holes in said vehicle trailer hitching socket covering means element base plate.

As another non-limiting example, a present invention modular vehicle trailer hitching socket covering means system trailer hitching socket mating tongue element can comprise gripping holes therethrough on at least two sides thereof and the trailer hitching socket mating tongue element can further comprise, as an auxiliary base plate, a cradling bracket with projecting mating grips present therein. When said trailer hitching socket mating tongue element is slid into said mounting bracket, said projecting mating grips snap into said gripping holes therethrough. The cradling bracket can further comprise a plurality of mounting holes and a trailer hitching socket mating tongue element and a selected interchangable vehicle trailer hitching socket covering means element can be detachably secured to one another by threaded shafts, bolts or screws which project through at least some of said plurality of mounting holes through said cradle bracket and screw into corresponding threaded mounting holes in said vehicle trailer hitching socket covering means element base plate.

The present invention will be better understood by reference to the Detailed Description Section of this Disclosure, with appropriate reference being had to the Drawings.

SUMMARY OF THE INVENTION

It is therefore a primary purpose of the present invention to provide a modular, lighted, vehicle trailer hitching socket covering means system which when mounted to a vehicle trailer hitching socket essentially blocks it from view in a decorative manner.

It is a purpose of the present disclosure to provide examples of present invention system realization.

It is another purpose of the present disclosure to provide an exemplary method of application of the present invention system.

BRIEF DESCRIPTION OF THE DRAWINGS

FIG. 1a shows a perspective view of a possible present invention trailer hitching socket mating tongue element (TE) with an auxiliary base plate (ABP) attached thereto.

FIG. 1b show a side view of said FIG. 1a trailer hitching socket mating-tongue element (TE) and auxiliary base plate (ABP) system, secured to a base plate (BP)

FIG. 2a shows a modified present invention trailer hitching socket mating tongue element (TE) which has securing holes (SC) therein. Also shown are gripping holes (GH) on two sides opposed thereof.

FIG. 2b shows an auxiliary base plate (ie. cradling mounting bracket) (APB') with mating grips (G) present therein FIG. 2c shows a side view of the FIG. 2a present invention trailer hitching socket mating tongue element (TE), and the FIG. 2b auxiliary base plate (ie. cradling mounting bracket) snapped together.

FIG. 2d shows a top view of the FIG. 2a present invention trailer hitching socket mating tongue element (TE), and the FIG. 2b auxiliary base plate (ie. cradling mounting bracket) snapped together.

FIGS. 3a and 4a show front elevational views of a demonstrative present invention football demonstrative and basketball/soccer-ball vehicle trailer hitching socket covering means, respectively.

FIG. 3c shows a side view of the present invention vehicle trailer hitching socket covering means shown in FIG. 3a.

FIGS. 3b and 4b back elevational views of a demonstrative present invention football demonstrative and basketball/soccer-ball vehicle trailer hitching socket covering means, respectively.

FIGS. 5a and 5b show top and side elevational views of a light socket (LS), which mounts in a present invention vehicle trailer hitching socket covering means embodiment as indicated in FIG. 6b.

FIG. 6a shows a front elevational view of a present invention vehicle trailer hitching socket covering means (FB) with an emblem (EMB) mounted over the light hole (LH).

FIG. 6b shows a FIG. 5a and 5b light socket (LS) mounted inside a FIG. 6a present invention vehicle trailer hitching socket covering means (FB) by means of screws (SC).

FIG. 7 shows an additional present invention modular element which is a back cover, demonstrated on a football shaped (FBC) vehicle trailer hitching socket covering means.

FIG. 8 shows the FIG. 7 back cover (FBC) placed over the back of a present invention vehicle trailer hitching socket covering means (FB) with the trailer hitching socket mating tongue element (TE) passing through the tongue element hole (TEH).

FIG. 9 shows the typical location of a vehicle trailer hitching socket on a typical vehicle, as being just below the back bumper (BUMPER).

FIG. 10 shows a partial front elevational view of a demonstrative present invention football vehicle trailer hitching socket covering means (FB) mounted in a vehicle trailer hitching socket located as shown in FIG. 9.

DETAILED DESCRIPTION

Turning now to the Drawings, there is shown in FIG. 1a, a perspective view of a possible present invention trailer hitching socket mating tongue element (TE) with an auxiliary base plate (ABP) attached thereto, which trailer hitching socket mating tongue element (TE) has securing holes (SC) therein. In use said securing holes (SC) can be used to secure said present invention trailer hitching socket mating tongue element (TE) in a vehicle trailer hitching socket (VHS), which as shown in FIG. 9 is typically present on a vehicle below a rear bumper (BUMPER). FIG. 1b show a side view of said FIG. 1a trailer hitching socket mating tongue element (TE) and auxiliary base plate (ABP) system, secured to a base plate (BP), which as shown in FIGS. 3b and 4b is secured inside a present invention trailer hitching socket covering means system element (FB), (BB-SB). FIG. 2a shows a modified present invention trailer hitching socket mating tongue element (TE) has securing holes (SC) therein. Also shown are gripping holes (GH) on two sides opposed thereof. FIG. 2b shows an auxiliary base plate (ie. cradling mounting bracket) (APB') with mating grips (G) present therein such that when a FIG. 2b auxiliary base plate (APB'), is snapped onto a FIG. 1a trailer hitching socket mating tongue element (TE), (or stated alternatively, when said trailer hitching socket mating tongue element (TE) is slid into a mounting bracket (APB') auxiliary base plate), said grips (G) snap into said auximoury base plate mounting bracket (APB') gripping holes (GH). This is demonstrated by FIGS. 2c and 2d. It is noted that a mounting bracket can have grips (G) on two sides as shown, plus grips on the top and bottom, and a modified FIG. 2a present invention trailer hitching socket mating tongue element (TE) can have gripping holes (GH) on the top and bottom as well. It is noted that FIGS. 1a, 1b, 2a, 2b, 2c and 2d show demonstrative, non-limiting, means for securing an auxiliary base plate (ABP (ABP') to a trailer hitching socket mating tongue element (TE). Any functionally equivalent means for removably securing a base plate (ABP (ABP') to a trailer hitching socket mating tongue element (TE) is to be considered within the scope of the present invention. Note also the presence of mounting holes (MH) in 1a, 1b and 2a. Said mounting holes are typically simply holes, that is, there is no internal threading present therein.

Turning now to FIGS. 3a and 4athere are shown front elevational views of a demonstrative present invention football and demonstrative basketball/soccer-ball vehicle trailer hitching socket covering means. In particular note that FIGS. 3a & 3b and 4a & 4b show that a light hole (LH) is present in each present invention embodiment shown. FIGS. 5a and 5b also show a light socket (LS), (which mounts in a present invention embodiment as indicated in FIG. 6b). Said FIGS. 3b and 4b show back elevational views of the present invention vehicle trailer hitching socket covering means shown in FIGS. 3a and 4a, and FIG. 3c shows a side view of the present invention vehicle trailer hitching socket covering means shown in FIG. 3a. The important thing to note in each of FIGS. 2b and 3b is that the base plate (BP), as shown in FIG. 1b, is secured therein. Also note that FIGS. 3b and 4b show the presence of threaded mounting holes (TMH) in the base plate (BP) as well as adjacent to the light hole (LH). In use, mounting holes in a FIG. 1a auxiliary base plate (ABP) or a FIG. 2b auxiliary base plate (APB') allow screws (SC) to pass therethrough and be tightened into threaded mounting holes (TMH) in base plate a (BP). Similarly, screws (SC) allow securing light socket (LS) inside a FIG. 3b or FIG. 4b present invention vehicle trailer hitching socket covering means (FB) or BB-SB, respectively.

FIG. 6a shows a front elevational view of a present invention vehicle trailer hitching socket covering means (FB) with an emblem (EMB) mounted over the light hole (LH). As already alluded to, FIG. 6b shows a FIG. 5a and 5b light socket (LS) mounted inside a FIG. 6a present invention vehicle trailer hitching socket covering means (FB) by non-limiting means of screws (SC) which pass through mounting holes (MH) in the light socket (LS), and into threaded mounting holes (TMH) inside the FIG. 6a present invention vehicle trailer hitching socket covering means (FB). It is to be noted that FIG. 6a shows that a present invention vehicle trailer hitching socket covering means (FB) which is shaped like a football, preferably has "ball-laces" present. Said "ball-laces" are either molded into the vehicle trailer hitching socket covering means (FB) or made separately and affixed thereto. In the later case, assembly typically takes the form of providing fabricating said ball-laces to have threaded shafts projecting therefrom, then effecting holes through the vehicle trailer hitching socket covering means (FB) through which said threaded shafts are caused to project so that nuts can secure them in place. However, it is also within the scope of the present invention to weld "ball-laces" in place or to use glue etc.

FIG. 7 shows an additional modular element which is a back cover, demonstrated as a football back cover (FBC). As can be gleened from FIGS. 3b, 4b and 6b as one views the inside of a typical present invention vehicle trailer hitching socket covering means, one will see a concave volume. In use, dirt etc. will tend to accumulate therein. As shown in FIG. 8, the FIG. 7 back cover, (demonstrated as a football back cover (FBC)), is in use, caused to be placed over the back of a present invention vehicle trailer hitching socket covering means with the trailer hitching socket mating tongue element (TE) slideably passing through the tongue element hole (TEH), which is sized and shaped to conform to the outer shape of said trailer hitching socket mating tongue element (TE). The outer shape of a back cover is typically selected such that it closely conforms to the outer peripheral shape of the vehicle trailer hitching socket covering means to which it is affixed.

As already alluded to infra herein, FIG. 9 shows the typical location of a vehicle trailer hitching socket on a typical vehicle, is just below the back bumper (BUMPER). FIG. 9 shows a rod (R) present through the vehicle trailer hitching socket, and a locking means (LM) present on an end of said rod (R). FIG. 10 shows a partial front elevational view of a demonstrative present invention football vehicle trailer hitching socket covering means mounted in a vehicle trailer hitching socket located as shown in FIG. 9. FIGS. 6a and 10 both show emblems (EMB) with projecting lines therearound. (Note, said emblem can be a simple light diffusing means without any markings thereon and be within the scope of the present invention). Said projecting lines represent light radiation which diffusely appears therethrough from an energized light bulb (LB) in light socket (LS) as shown in FIGS. 5a and 5bThe wires (W) shown in FIGS. 5a and 6b, it is noted, can be electrically connected to constant vehicle battery potential in use, or caused to obtain voltage through a brake pedal and/or emergency switch.

It should now be clear that the present invention is "modular" in that a user thereof can obtain one present invention "trailer hitching socket mating tongue element (TE)/auxiliary base plate (ABP) (ABP') system" and affix said auxiliary base plate to any of a plurality or multiplicity of present invention vehicle trailer hitching socket covering means systems which when mounted to a vehicle trailer hitching socket essentially blocks it from view in a decorative manner. Football and Basketball/Soccer-ball demonstrative, non-limiting examples of present invention vehicle trailer hitching socket covering means systems were specifically shown herein. Interconnection of a present invention trailer hitching socket mating tongue element (TE)/auxiliary base plate (ABP) (ABP') system present invention vehicle trailer hitching socket covering means system can be easily achieved by user securing means, demonstrated herein as simple screws (SC). It is within the scope of the present invention to secure a present invention trailer hitching socket mating tongue element (TE) into a vehicle trailer hitching socket by any convenient means, and securing holes (SC) are shown as a simple representative, non-limiting, means therefore. A simple rod can be extended through said securing holes (SC) via holes in a vehicle trailer hitching socket. Preferred practice is to then lock said rod into place by use of known locking means. It is specifically noted that once in place on a vehicle, access to the inside of a present invention vehicle trailer hitching socket covering means system (FB) (BB-SB) etc., is essentially impossible, particularly where a back cover (FBC) is in place, thereby providing security against theft.

Note, in the Claims, where a shape is described as "half of a - - - ", (eg. football), it is to be understood that the cross-section is taken through in a front elevation view as shown in the drawings, rather than in a cross-section taken in a side elevation view.

Note also, that a threaded mounting hole in a base plate (BP) in a vehicle trailer hitching socket covering means element can have a threaded shaft, bolt or screw secured therein, which in use will project through mounting holes in an auxiliary base plate (ABP) (ABP'). This will allow detachably securing of said trailer hitching socket mating tongue element to a vehicle trailer hitching socket covering means elements by use of nuts rather than screws. Such functional equivalents are to be considered within the language reciting the use of screws to effect said "detachable securing".

Finally, it is within the scope of the preferred present invention embodiment to plate the outer surface of a vehicle trailer hitching socket covering means element with an appearance improving material such as chromium, nickel, nickel-chromium, cadmium, etc., and to apply logos, paint etc. to the outer surface of the present invention, in addition to placement of a light diffusing means which can contain an emblem. Very impressive results have been achieved, for instance, where a football shaped vehicle trailer hitching socket covering means is plated with nickel-chromium.

Having hereby disclosed the subject matter of this invention, it should be obvious that many modifications, substitutions and variations of the present invention are possible in light thereof. It is therefore to be understood that the invention may be practiced other than as specifically described, and should be limited in breadth and scope only by the Claims.

We claim:

1. A modular vehicle trailer hitching socket covering means system, comprising:
    a trailer hitching socket mating tongue element, and
    a vehicle trailer hitching socket covering means element, said trailer hitching socket mating tongue element and
        said vehicle trailer hitching socket covering means element being detachably secured to one another, such that when the combined system is mounted to a vehicle trailer hitching socket by insertion of said trailer hitching socket mating tongue element into a vehicle mounted trailer hitching socket, the result is that said vehicle mounted trailer hitching socket is decoratively predominately blocked from view;
    said vehicle trailer hitching socket covering means element having a light hole therethrough, at least one threaded mounting hole therein, and a light socket mounted inside said vehicle trailer hitching socket covering means element by screw means, said screw means passing through at least one mounting hole in said light socket and into said at least one threaded mounting hole;
    such that light caused to emanate from a light bulb placed inside said socket, when electric voltage is functionally applied to said light bulb, passes through said light hole;
    said vehicle trailer hitching socket covering means element further comprising light diffusing means present thereon such that light passing through said light hole in use is diffused thereby.

2. A modular vehicle trailer hitching socket covering means system as in claim 1, wherein the light diffusing means is made of a light diffusing plastic material.

3. A modular vehicle trailer hitching socket covering means system as in claim 1, wherein the light diffusing means contains an emblem.

4. A modular vehicle trailer hitching socket covering means system as in claim 1, in which the vehicle trailer hitching socket covering means element is selected from a group consisting of footballs, basketballs and soccer balls.

5. A modular vehicle trailer hitching socket covering means system as in claim 1, in which said light bulb is provided electrical voltage from a selection from a group consisting of said vehicle battery, brake light controlling switch and an emergency activated switch.

6. A modular vehicle trailer hitching socket covering means system as in claim 1, in which said trailer hitching socket mating tongue element comprises an auxiliary base plate with a plurality of mounting holes therethrough, and in which said vehicle trailer hitching socket covering means element comprises a base plate therewithin which has a plurality of threaded mounting holes therein; said trailer hitching socket mating tongue element and vehicle trailer hitching socket covering means element being detachably secured to one another by threaded shafts which project through at least some of said plurality of mounting holes through said auxiliary base plate and screw into corresponding threaded mounting holes in said vehicle trailer hitching socket covering means element base plate.

7. A modular vehicle trailer hitching socket covering means system as in claim 1, in which said trailer hitching socket mating tongue element comprises gripping holes therethrough on at least two sides thereof, which trailer hitching socket mating tongue element further comprises as an auxiliary base plate a cradling bracket with projecting mating grips present therein, such that when said trailer hitching socket mating tongue element is slid into said mounting bracket said projecting mating grips snap into said gripping holes therethrough; said cradling bracket further comprising a plurality of mounting holes; said trailer hitching socket mating tongue element and said vehicle trailer hitching socket covering means element being detachably secured to one another by threaded shafts which project through at least some of said plurality of mounting holes through said cradle bracket and screw into corresponding threaded mounting holes in said vehicle trailer hitching socket covering means element base plate.

8. A modular vehicle trailer hitching socket covering means system as in claim 1, in which said light socket mounted inside said vehicle trailer hitching socket covering means element, is affixed to said vehicle trailer hitching socket covering means element by threaded shafts which pass through mounting holes in said light socket, and screw into corresponding threaded holes inside said vehicle trailer hitching socket covering means.

9. A modular vehicle trailer hitching socket covering means system as in claim 1 in which the vehicle trailer hitching socket covering means elements have the outer surface thereof plated with an appearance improving material.

* * * * *